(12) United States Patent
Kim et al.

(10) Patent No.: US 9,009,533 B2
(45) Date of Patent: Apr. 14, 2015

(54) HOME/BUILDING FAULT ANALYSIS SYSTEM USING RESOURCE CONNECTION MAP LOG AND METHOD THEREOF

(71) Applicant: Electronics and Telecommunications Research Institute, Daejeon (KR)

(72) Inventors: Jeu Young Kim, Seoul (KR); Ji Yeon Son, Daejeon (KR); Ji Hyun Lee, Daejeon (KR); Jun Hee Park, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 201 days.

(21) Appl. No.: 13/724,944

(22) Filed: Dec. 21, 2012

(65) Prior Publication Data

US 2013/0173959 A1 Jul. 4, 2013

(30) Foreign Application Priority Data

Dec. 29, 2011 (KR) .................. 10-2011-0145565
Mar. 23, 2012 (KR) .................. 10-2012-0029827

(51) Int. Cl.
*G06F 11/00* (2006.01)
*G06F 11/07* (2006.01)
*H04L 12/24* (2006.01)

(52) U.S. Cl.
CPC .......... *G06F 11/0793* (2013.01); *H04L 41/069* (2013.01)

(58) Field of Classification Search
CPC .............. G06F 11/0778; G06F 11/079; G06F 11/3466; G06F 11/1471; G06F 11/1435
USPC .................................................. 714/20, 37
See application file for complete search history.

(56) References Cited

U.S. PATENT DOCUMENTS

| | | | |
|---|---|---|---|
| 6,892,317 B1 | 5/2005 | Sampath et al. | |
| 7,441,152 B2 | 10/2008 | Kato | |
| 2003/0004680 A1 | 1/2003 | Dara-Abrams et al. | |
| 2011/0153236 A1* | 6/2011 | Montreuil et al. | .............. 702/59 |

FOREIGN PATENT DOCUMENTS

| | | |
|---|---|---|
| JP | 2005-32192 | 2/2005 |
| KR | 2003-0032406 | 4/2003 |

* cited by examiner

*Primary Examiner* — Yair Leibovich
(74) *Attorney, Agent, or Firm* — Nelson Mullins Riley & Scarborough LLP (57) ABSTRACT

Provided are a home/building fault analysis system and method using a resource connection map log which compares and analyzes a previous integrated resource state and a current resource state using resource connection map logging information based on a standard resource management model when a fault is generated, provides state information of the resource in which information having high association with a fault resource is mainly changed, and performs an effective fault analysis and process by restoring to the previous resource state, as necessary. According to the prevent invention, when the fault is generated, a synthetic state of resources within a home/building as well as a state of an individual resource may be known from the resource connection map.

17 Claims, 3 Drawing Sheets

HOME/BUILDING FAULT ANALYSIS SYSTEM USING RESOURCE CONNECTION MAP LOG AND METHOD THEREOF

CLAIM FOR PRIORITY

This application claims priority to Korean Patent Application No. 10-2011-0145565 filed on Dec. 29, 2011 and No. 10-2012-0029827 filed on Mar. 23, 2012 in the Korean Intellectual Property Office (KIPO), the entire contents of which are hereby incorporated by reference.

BACKGROUND

1. Technical Field

Example embodiments of the present invention relate in general to a home/building fault analysis system and method using a resource connection map log, and more specifically, to a home/building fault analysis system and method using a resource connection map log, which compares and analyzes a previous integrated resource state and a current resource state using resource connection map logging information based on a standard resource management model, when any fault is generated to thereby provide state information of a resource in which information having high association with fault resource is mainly changed, and to restore to the previous resource state as necessary, and therefore effective fault analysis and process may be performed.

2. Related Art

In recent years, with the development of hardware and software technologies, a variety of types of devices, networks, services, and the like have emerged. Accordingly, the number of resources that should be managed by people or computers has been rapidly increasing.

In particular, demands for integrally managing resources within a domain connected to a network in a unit of a specific domain such as home or building are increasing.

In recent years, to respond to these demands, a system which may record, in real time, events including a variety of types of failures and states which are generated in electrical and electronic equipment within the house, in a digital home configured by a communicable environment, store the recorded events in a recording system, and then search or manage the stored contents, has been proposed.

A resource management system within a conventional home network may act as an information archive which may record and keep states of a variety of equipment connected with the home network, and thereafter provide information in which whether operations of the equipment are normally performed, is determined through searching at a necessary timing to thereby analyze normal operation information of each equipment, and even causes for disaster that occurred in the home. However, there still exists a problem in that the resource management system is not sufficient for integrally managing a variety of resources connected within the home network.

In addition, in the related art, only management for device resources has been provided, and a method of solving problems occurring between resources in the home by analyzing dependence on the same resource as well as a mechanism for integrally managing home resources by recognizing the need of network resources, has not existed.

In addition, in the related art, there are problems in that a method for managing a multi-service framework does not exist, and applications of codes become difficult in accordance with environment conversion as service logic and execution code are integrated and developed.

In addition, in the related art, in order to efficiently utilize intelligent home resources and ensure quality of services, only system-centric resource management is performed, and there are limitations on integrated management of devices, networks, and services. In addition, searching of network topology is time-consuming, accuracy falls in the case of a complex network, and integrated management of home resources is insufficient.

SUMMARY

Accordingly, example embodiments of the present invention are provided to substantially obviate one or more problems due to limitations and disadvantages of the related art.

Example embodiments of the present invention provide a home/building fault analysis system and method using a resource connection map log which compares and analyzes a previous integrated resource state and a current resource state using a resource connection map logging information based on a standard resource management model when a fault is generated, provides state information of the resource in which information having high association with a fault resource is mainly changed, and performs an effective fault analysis and process by restoring to the previous resource state, as necessary.

In some example embodiments, a home/building fault analysis system includes: a plurality of resources that include at least one of a plurality of devices, networks, and services; and a home/building log-based fault management device that is connected with each of the resources via a network to thereby collect information of each of the resources, generates and maintains a resource connection map based on the collected information of each of the resources, compares and analyzes, when a fault is generated, a previous integrated resource state and a current resource state using resource connection map logging information to thereby provide, to a user, state information of the resource in which information having high association with a fault resource is mainly changed, and performs an effective fault analysis and process by restoring the current resource state to the previous resource state, as necessary.

Here, the home/building log-based fault management device may include a plurality of resource information collection modules that are connected with the plurality of resources via the network to thereby periodically collect the information of each of the resources, a home/building resource management module that processes resources within a home/building to targets to be managed based on the information of the resources collected from each of the plurality of resource information collection modules, and analyzes a relation between the resources to thereby generate the resource connection map, a local storage module that stores the resource connection map periodically transmitted from the home/building resource management module, and information about resource events, and a fault analysis and state restoration module that compares and analyzes, when a fault is generated, the previous integrated resource state and the current resource state using the resource connection map logging information transmitted from the home/building resource management module to thereby provide, to the user, the state information of the resource in which information having high association with the fault resource is mainly changed, and performs an effective fault analysis and process by restoring the current resource state to the previous resource state, as necessary.

Preferably, the home/building resource management module may be provided with the information of the resources periodically collected through each of the plurality of resource information collection modules to thereby generate the resource connection map, transmit the generated resource connection map to the local storage module or the fault analysis and state restoration module, manage the managed resource and connection information so that the information associated with the resource to be managed is periodically recorded in the local storage module, and manage event information when an event is generated so that the event information is stored in the local storage module.

Preferably, the home/building resource management module may include an integrated information storage unit for each resource that is provided with the information of the resources periodically collected from each of the plurality of resource information collection module to thereby store integrate information for each resource, an integrated resource connection map generating unit that aggregates all the integrated information for each resource stored in the integrated information storage unit to thereby generate an integrated resource connection map of all resources, a resource connection map and event logging unit that synthetically manages the resource connection map transmitted from the integrated resource connection map generating unit and a variety of event logs, and performs resource connection map and event logging, and a logging information providing unit that provides information logged from the resource connection map and event logging unit to the local storage module or the fault analysis and state restoration module.

Preferably, the resource connection map and event logging unit may periodically log and record a current resource connection map managed in the integrated resource connection map generating unit to thereby transmit the recorded current resource connection map to the logging information providing unit, log and record information associated with an event generation time when an event is generated in the home/building resource management module to thereby transmit the recorded information to the logging information providing unit, and provide the resource connection map of a specific timestamp based on the logged contents to the logging information providing unit.

Preferably, the fault analysis and state restoration module may analyze the fault based on the resource connection map managed in the home/building resource management module, be provided with corresponding fault generation information through the home/building resource management module when the fault is generated in the resource to be managed in the home/building, request the fault analysis from the home/building resource management module when a resource control execution has failed, when an error message is received, or when a request of the user is received, be provided, from the home/building resource management module, with a log resource connection map when the resource exists in the resource connection map or when the resource control execution has succeeded to thereby analyze any differences with a current resource connection map, and restore the resource state to the previous state based on the results of the analysis.

Preferably, the fault analysis and state restoration module may include a timestamp log information requesting unit that requests the resource connection map logging information of a specific timestamp from the home/building resource management module, a current map and log map analyzing unit that compares and analyzes differences between the resource connection map of the specific timestamp requested by the home/building resource management module through the timestamp log information requesting unit and the current resource connection map, and a fault analysis result processing and resource state restoring unit that receives results analyzed through the current map and log map analyzing unit in a stepwise manner to thereby determine the cause of an error or restore the current resource state to the previous state.

Preferably, the current map and log map analyzing unit may analyze a change in relation between a log resource connection map of the specific timestamp and the current resource connection map, or analyze a change between the current resource state and a log resource state of the specific timestamp.

Preferably, the fault analysis result processing and resource state restoring unit may restore all the resources of the resource connection map to a resource state when being logged, or restore all the resources to a resource state when being logged in a stepwise manner along the resource connection map.

In other example embodiments, a method for analyzing faults of resources within a home/building using a resource connection map log in a system including a plurality of resources and a home/building log-based fault management device, the method includes: collecting information of each of the resources through the home/building log-based fault management device, and generating and maintaining a resource connection map based on the collected information of each of the resources; comparing and analyzing, when a fault is generated, a previous integrated resource state and a current resource state using resource connection map logging information to thereby provide, to a user, state information of the resource in which information having high association with a fault resource is mainly changed; and performing effective fault analysis and process by restoring the current resource state to the previous resource state, as necessary.

Here, after the collecting of the information, the method may further include requesting home/building fault analysis from the home/building log-based fault management device when resource control execution has failed, or requesting home/building fault analysis when receiving an error message.

Preferably, after the collecting of the information, the method may further include requesting, from the home/building log-based fault management device, home/building log with respect to a point of time when the resource control execution has succeeded, or requesting home/building log with respect to a point of time when the resource exists most recently.

Preferably, after the collecting of the information, the method may further include returning the entire log resource connection map of a point of time when the home/building log is requested through the home/building log-based fault management device, or returning only relevant information about the requested resource of the point of time when the home/building log is requested.

Preferably, in the comparing and analyzing, a criterion of the home/building log analysis may be determined by a predetermined policy using characteristics of the resource connection map.

Preferably, the predetermined policy may be determined by any one of a depth of the resource map, a relation type, a target domain, and a policy provided by the user.

Preferably, in the comparing and analyzing, the home/building log analysis may be performed through the home/building log-based fault management device by analyzing a change in relation between a current resource connection map and a log resource connection ma, or analyzing a change between a current resource state and a log resource state.

Preferably, after the comparing and analyzing, a home/building resource state restoration requesting method may be performed through the home/building log-based fault management device by requesting restoration of all the resources of the resource connection map to a resource state when being logged, or by requesting restoration to a resource state when being logged in a stepwise manner along the resource connection map.

Preferably, after the comparing and analyzing, a home/building resource state restoration requesting method may be performed through the home/building log-based fault management device by restoring a static state of the resource, or restoring a dynamic state of the resource.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relations between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

It should also be noted that in some alternative implementations, operations may be performed out of the sequences depicted in the flowcharts. For example, two operations shown in the drawings to be performed in succession may in fact be executed substantially concurrently or even in reverse of the order shown, depending upon the functionality/acts involved.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams, or in the respective steps of the sequence diagram. Since the computer program instructions, in order to implement functions in specific manner, may be stored in a memory useable or readable by a computer aiming for a computer or other programmable data processing apparatus, the instructions stored in the memory, useable or readable by a computer, may produce manufacturing items including an instruction device for performing functions described in the respective blocks of the block diagrams, and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams, and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously, or often in reverse order according to corresponding functions.

First, a home/building fault analysis system using a resource connection map log according to an embodiment of the present invention compares and analyzes, when a fault is generated, a previous integrated resource state and a current resource state using resource connection map logging information based on a standard resource management model to thereby provide state information of the resource in which information having high association with a fault resource is mainly changed, and performs an effective fault analysis and process by restoring the current resource state to the previous resource state, as necessary.

In addition, in a home/building fault analysis method using a resource connection map log according to an embodiment of the present invention, when the fault is generated, a synthetic state of resources within a home/building as well as a state of an individual resource may be known from the resource connection map, and existing resources and resource connection information may be obtained, and therefore the cause of the fault may be analyzed by comparison with a current resource state.

Hereinafter, preferred embodiments of the present invention will be described in more detail in reference with the accompanying drawings. Throughout the accompanying drawings, the same reference numerals are used to designate the same or similar components, and redundant descriptions thereof are omitted for easier overall understanding.

Figure 1:
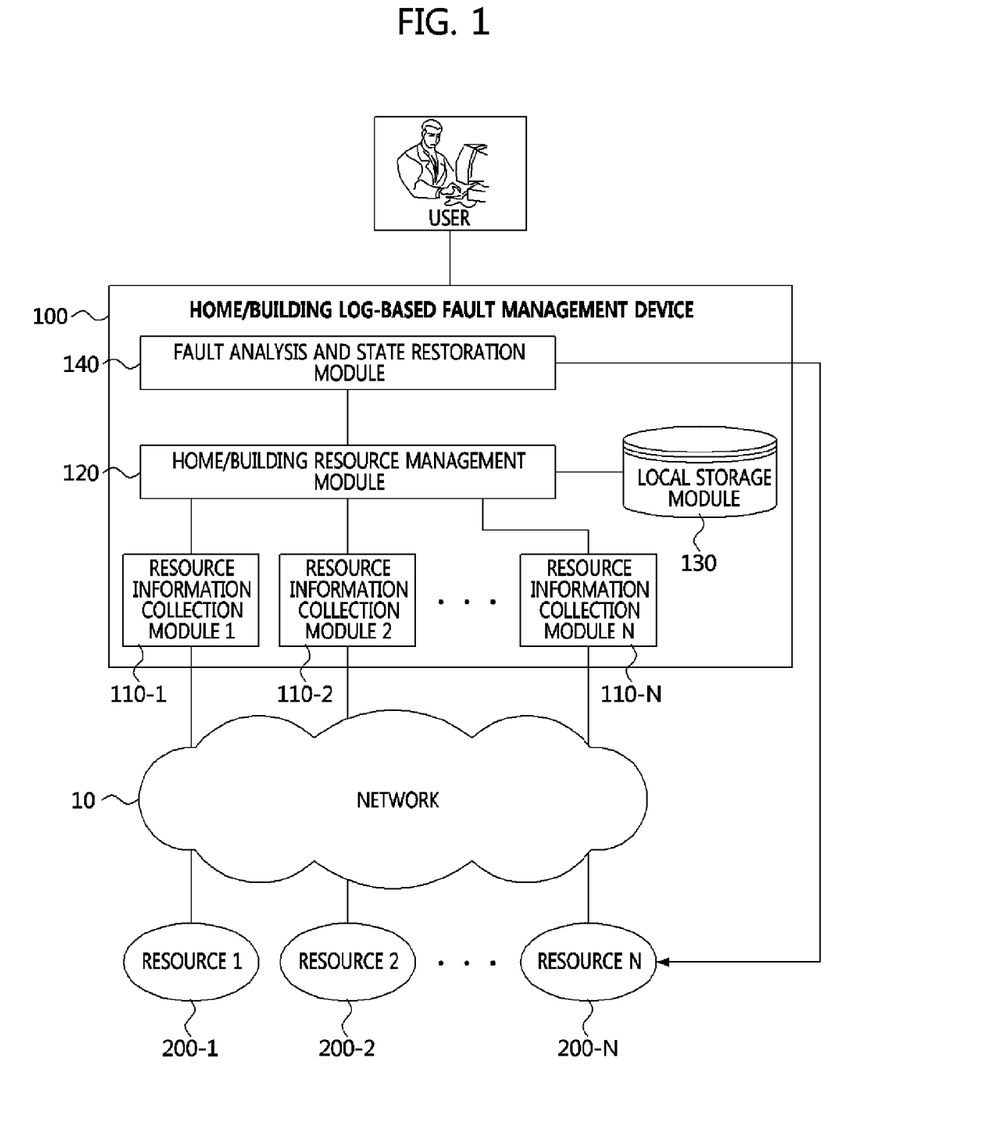
FIG. 1 is a block diagram illustrating a home/building fault analysis system using a resource connection map log according to an embodiment of the present invention.
Figure 2:
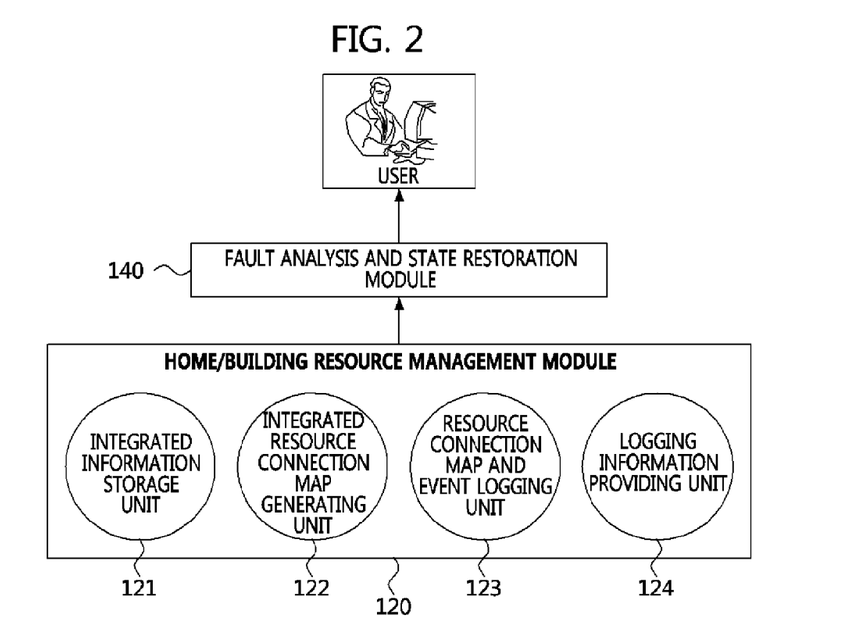
FIG. 2 is a block diagram illustrating a home/building resource management module applied to an embodiment of the present invention.
Figure 3:
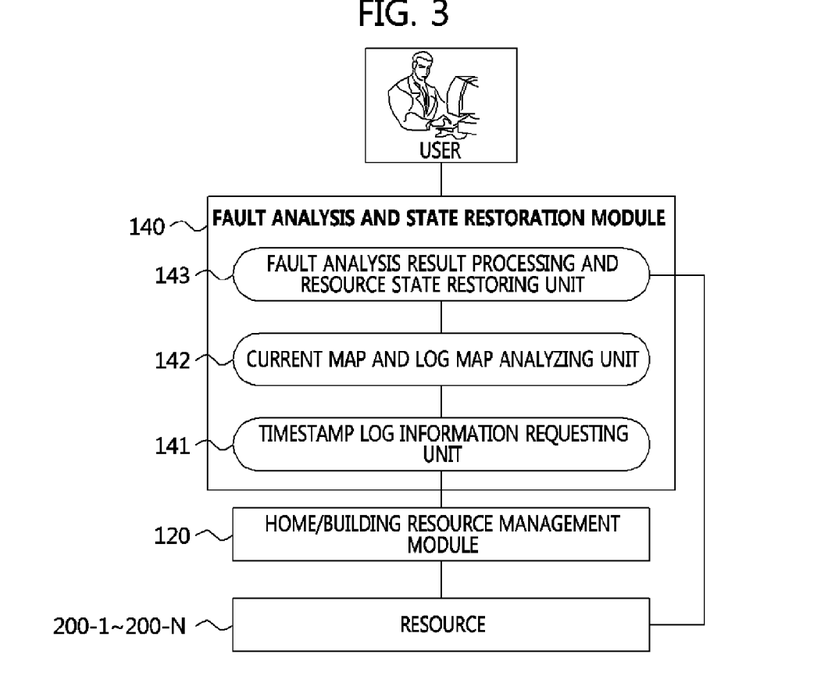
FIG. 3 is a block diagram illustrating a fault analysis and state restoration module applied to an embodiment of the present invention.

FIG. 1 is a block diagram illustrating a home/building fault analysis system using a resource connection map log according to an embodiment of the present invention, FIG. 2 is a block diagram illustrating a home/building resource management module applied to an embodiment of the present invention, and FIG. 3 is a block diagram illustrating a fault analysis and state restoration module applied to an embodiment of the present invention.

Referring to FIGS. 1 to 3, the home/building fault analysis system using the resource connection map log according to an embodiment of the present invention includes a home/building log-based fault management device 100, and a plurality of resources 200-1 to 200-N connected with the home/building fault analysis system via a network 10.

Here, the home/building log-based fault management device 100 collects information of each of the resources 200-1 to 200-N, generates and maintains a resource connection map based on the collected information of each of the resources, compares and analyzes, when a fault is generated, a previous integrated resource state and a current resource state using resource connection map logging information to thereby provide, to a user, state information of the resource in which information having high association with a fault resource is mainly changed, and performs an effective fault analysis and process by restoring the current resource state to the previous resource state, as necessary.

The home/building log-based fault management device 100 includes a plurality of resource information collection modules 110-1 to 110-N, a home/building resource management module 120, a local storage module 130, and a fault analysis and state restoration module 140.

Here, the plurality of resource information collection modules 110-1 to 110-N may be connected, via the network 10, with a plurality of resources 200-1 to 200-N including a plurality of devices, networks, or services, and periodically collect monitoring information (for example, a resource object, information of a relation object, or the like) of the resources including the plurality of devices, the networks, or the services.

In addition, the plurality of resource information collection modules 110-1 to 110-N collects information of home/building resources based on a network to be managed in the home/building log-based fault management device 100, and the resource information may be collected through a variety of collection paths. For example, the information may be collected through an adaptor for each network or middleware, and the information may be collected from static data (DB or the like) such as design information.

Meanwhile, all wireless/wired networks that can be utilized as near/short distance networks such as Ethernet, wireless RAN, RS485, zigbee, power line communication (PLC), Bluetooth, and the like, may be applied to the network 10.

The home/building resource management module 120 is provided with information of the resources 200-1 to 200-N including the plurality of devices, the networks, and the services which are periodically collected through at least one resource information collection module 110-1 to 110-N to thereby generate a resource connection map, and transmits the generated resource connection map to the local storage module 130 or the fault analysis and state restoration module 140. In this instance, any information of the collected resources may be used as long as the information can be managed within a home/building such as devices, networks, users, and the like.

That is, the home/building resource management module 120 is provided with information of the resources existing in the home or the building to thereby objectify the provided information in accordance with each domain, and analyzes a relation between the resources to thereby generate a relation object. In addition, when a new resource is added or deleted, the home/building resource management module 120 applies the added or deleted contents to the resource connection map, and when a separate application service requests a current resource connection map, the home/building resource management module 120 provides the resource connection map.

In addition, when a fault is generated among all resources to be managed by the fault analysis system in a home or a building, the home/building resource management module 120 may detect the generation of the fault, and notify the fault analysis and state restoration module 140.

In addition, the home/building resource management module 120 may process, to a target to be managed, resources within the home/building based on the information of the resources collected from at least one resource information collection module 110-1 to 110-N, and analyze a relation between the resources. In this instance, it is preferable that the analyzed relation information be managed as an information map in the form of a graph.

In addition, the home/building resource management module 120 periodically records the managed resource and the connection information in the local storage module 130, and stores event information in the local storage module 130 when an event is generated. That is, previous log resource information and the connection information may be provided based on the information recorded in the local storage module 130.

The "resources" refer to all resources such as a television or a computer installed in a living room or a lobby within a home or a building, a variety of electronic equipment, or network devices connected with the variety of electronic equipment.

The resource connection map (or resource map) has objectified resource information and relation information between the resources in the form of a linked list, denotes a relation with respect to each of resources included in domains that are hierarchically divided, and is a graph model having a source object and a relation object as entities.

The resource object may include a variety of attribute information such as a name, a type, identify (ID), state information, or provision function of each of the resources to be managed in a home or a building, and preferably, each resource object may be one-to-one mapped with the resources to be actually managed, and generated.

As an example of a structure of the resource object, it is preferable that the resource object include resource object common information which all resources should have, and specific information for each resource which each resource has.

The resource object common information may include a resource object ID for identifying a corresponding resource object in the home/building resource management module 120, an object type, an object name, and the like. The resource object ID may be allocated by its own allocation method in the home/building resource management module 120, or allocated by receiving a resource ID system provided from the outside.

The specific information for each resource may include specific information which is limited to individual resources such as devices, networks, physical resources, or the like. As examples of the specific information with respect to device resources, a device state, a device hardware address, access authority, a physical position, and the like, may be given, and as examples of the specific information with respect to the network resource, a network link ID, a network line type, a parent/child link, a maximum bandwidth, a link state, error rate, traffic information, and the like, may be given. In addition, as examples of the specific information with respect to the physical resource, a coordinate value with respect to an absolute position, classes for distinguishing spatial information, structure information, or facility-related information, internal relation information, and the like, may be given.

The relation object may be an object defining relation between mutually different domains in which the resources are involved, and may include a relation name, a type, an ID and source resource object, and target resource objects. Meanwhile, as an example of a structure of the relation object, it is preferable that the relation object include a source resource object and a resource relation link list. Here, the source resource object refers to a resource object which is maintained in the home/building resource management module 120, and the resource relation link list includes relation information with other resource objects with respect to the source resource object.

That is, the home/building resource management module 120 generates a resource relation map that connects each resource object between domains and the relation object on a network with reference to the resource object collected through the plurality of resource information collection modules 110-1 to 110-N and information of the relation object. Such a resource connection map is transmitted to the fault analysis and state restoration module 140 to thereby be used in systematically investigating the resource in which a fault is generated.

The home/building resource management module 120 includes, as shown in FIG. 2, an integrated information storage unit 121 for each resource that stores integrated information for each resource, an integrated resource connection map generating unit 122 that generates an integrated resource connection map, a resource connection map and event logging unit 123 that performs resource connection map and event logging, and a logging information providing unit that provides logging information.

Here, the integrated information storage unit 121 for each resource is provided with information of the resources which is periodically collected from each of the plurality of resource information collection modules 110-1 to 110-N to thereby store integrated information for each resource.

That is, the integrated information storage unit 121 for each resource may classify the collected information in accordance with a domain which is managed in the home/building resource management module 120, and abstract the classified information as resource information that can be managed through a consistent interface. In this instance, as examples of the domain that can be managed as the resource, devices, networks, physical spaces, services, contents, and the like, may be given, and the domain may be diversely increased in accordance with the information that can be collected.

The integrated resource connection map generating unit 122 aggregates all the integrated information for each resource which is stored in the integrated information storage unit 121 to thereby generate an integrated resource connection map of all resources.

That is, the integrated resource connection map generating unit 122 analyzes relation information of the resources on mutually different domains to thereby generate a resource connection map in the form of a graph. For example, the integrated resource connection map generating unit 122 generates relation information with a physical space resource using position information of a device domain resource, and generates relation information between a network domain and a device domain using parent node information and child node information of a network link. In addition, even information between domains in which direct relation cannot be found may be obtained through indirect information. For example, relation information between a network and a physical space may be obtained using position information of a device, and relation information between the device and a network.

The resource connection map and event logging unit 123 synthetically manages the resource connection map transmitted from the integrated resource connection map generating unit 122 and a variety of event logs, periodically logs and records a current resource connection map managed in the integrated resource connection map generating unit 12, and transmits the recorded current resource connection map to the logging information providing unit 124.

In addition, when an event is generated in the home/building resource management module 120, the resource connection map and event logging unit 123 logs and records a point of time when the event is generated, and relation information, and transmits the recorded information to the logging information providing unit 124.

In addition, the resource connection map and event logging unit 123 provides a resource connection map of a specific timestamp to the logging information providing unit 124 based on the logged contents.

The logging information providing unit 124 provides information, which is logged from the resource connection map and event logging unit 123, to the local storage module 130 or the fault analysis and state restoration module 140.

The home/building resource management module 120 may hierarchically divide resources to be managed which exist in a home or a building, into a service domain, a device domain, a network domain, a physical domain, and the like, for each domain in accordance with the types of resources, and set relation between the resources existing for each domain.

The local storage module 130 is connected with the home/building resource management module 120, and stores the resource connection map which is periodically transmitted from the home/building resource management module 120, and information about resource events.

That is, the local storage module 130 is periodically provided with the current resource connection map such as current time, resource information, relation information between resources, and the like, from the home/building resource management module 120, and stores these in a database (DB).

The fault analysis and state restoration module 140 receives corresponding fault generation information through the home/building resource management module 120 when a fault is generated in an arbitrary resource to be managed in a home or a building.

In addition, the fault analysis and state restoration module 140 requests fault analysis from the home/building resource management module 120 when resource control execution has failed, when an error message is received, or when a request is received from a user.

In addition, the fault analysis and state restoration module 140 analyzes a fault based on the resource connection map which is managed in the home/building resource management module 120, is provided, from the home/building resource management module 120, with a log resource connection map when the resource exists in the resource connection map, or when the resource control execution has succeeded to thereby analyze any differences with the current resource connection map. In this instance, the fault analysis and state restoration module 140 restores the resource state to the previous state based on the results of the analysis.

That is, the fault analysis and state restoration module 140 compares and analyzes, when a fault is generated, a previous integrated resource state and the current resource state using the resource connection map logging information transmitted from the home/building resource management module 120 to thereby provide, to the user, state information of the resource in which information having high association with a fault resource is mainly changed, and performs an effective fault analysis and process by restoring the current resource state to the previous resource state, as necessary.

As shown in FIG. 3, the fault analysis and state restoration module 140 includes a timestamp log information requesting unit 141, a current map and log map analyzing unit 142, and a fault analysis result processing and resource state restoring unit 143.

The timestamp log information requesting unit 141 requests the resource connection map logging information of a specific timestamp from the home/building resource management module 120. When an error occurs in the home/building resource management module 120, the timestamp log information requesting unit 141 transmits error occurrence information to the fault analysis and state restoration module 140. In this instance, the timestamp log information requesting unit 141 of the fault analysis and state restoration module 140 requests, from the home/building resource management module 120, a log resource connection map of a specific timestamp based on the information about the error.

For example, when the resource does not exist in the current resource connection map, the timestamp log information requesting unit 141 requests a log resource connection map of a point of time when the resource exists. Otherwise, when the resource control execution has failed, the timestamp log information requesting unit 141 requests a log resource connection map of a point of time when the resource control execution has succeeded.

In this manner, the timestamp log information requesting unit 141 requests, from the home/building resource management module 120, the log resource connection map with respect to the point of time when the same resource control execution has succeeded, or requests, from the home/building resource management module 120, the log resource connection map with respect to the point of time when the resource exists most recently.

The current map and log map analyzing unit 142 compares and analyzes differences between the resource connection map of the specific timestamp requested by the home/building resource management module 120 through the timestamp log information requesting unit 141 and the current resource connection map.

That is, the current map and log map analyzing unit 142 analyzes a change in relation between the log resource connection map of the specific timestamp and the current resource connection map, or analyzes a change between the current resource state and a log resource state of the specific timestamp. Here, since the analysis is performed or stopped in accordance with the relation in a stepwise manner, therefore, analysis with respect to a desired part rather than analysis with respect to the entire part is organically performed to thereby realize efficient analysis.

The fault analysis result processing and resource state restoring unit 143 receives results analyzed through the current map and log map analyzing unit 142 in a stepwise manner to thereby determine the cause of an error or restore the current resource state to the previous state.

That is, the fault analysis result processing and resource state restoring unit 143 may restore all the resources of the resource connection map to a resource state when being logged, or restore all the resources to a resource state when being logged in a stepwise manner along the resource connection map.

For example, in the case of a network error, when error analysis is performed with respect to only a parent node or an upper link, the resource in which an error is last detected is a top-level resource, and therefore the cause of the error may be clearly found.

In addition, the fault analysis result processing and resource state restoring unit 143 does not restore a state of the resource in a lump based on the analysis results applied for each step, but restores a state of an individual resource, as necessary.

Meanwhile, the resource state may be restored by restoring a static state of the resource, or restoring a dynamic state of the resource.

Figure 4:
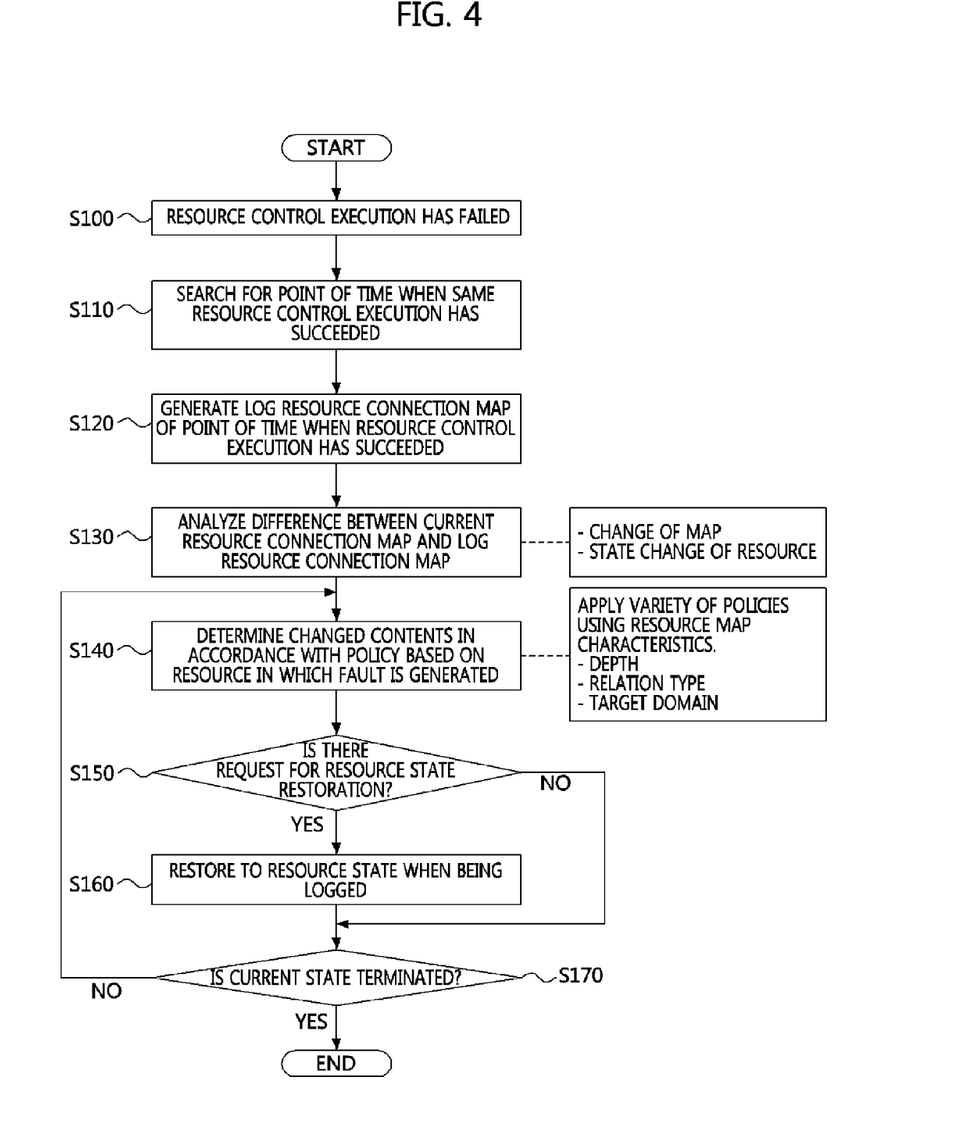
FIG. 4 is a flowchart illustrating a home/building fault analysis method using a resource connection map log according to an embodiment of the present invention.

FIG. 4 is a flowchart illustrating a home/building fault analysis method using a resource connection map log according to an embodiment of the present invention.

Referring to FIG. 4, in the home/building fault analysis method using the resource connection map log according to an embodiment of the present invention, when the resource control execution has failed through the home/building resource management module 120 in step S100, the timestamp log information requesting unit 141 requests, from the home/building resource management module 120, searching for the point of time when the same resource control execution has succeeded in step S110.

Next, in step S120, the logging information providing unit 124 of the home/building resource management module 120 generates a log resource connection map of the point of time when the resource control execution has succeeded, and transmits the generated log resource connection map to the fault analysis and state restoration module 140. In this instance, the logging information providing unit 124 may return the entire log resource connection map when the resource is requested, or return only relevant information about the requested resource when the resource is requested.

Next, in step S130, the current map and log map analyzing unit 142 of the fault analysis and state restoration module 140 analyzes (for example, analyzes a change of the map and a state change of the resource, or the like) a change between the log resource connection map and the current resource connection map.

In step S140, the current map and log map analyzing unit 142 analyzes and determines changed contents in accordance with a policy based on the resource in which a fault is generated.

In this instance, as a criterion of the home/building log analysis, a variety of policies (for example, a depth of the resource connection map, a relation type, a target domain, a policy provided from a user, or the like) may be applied using characteristics of the resource connection map.

Next, the fault analysis result processing and resource state restoring unit 143 of the fault analysis and state restoration module 140 determines whether there is a request for resource state restoration in step S150, restores to a resource state of a point of time when being logged when there is the request for resource state restoration in step S160, and determines whether to terminate the current state in step 170.

When the current state is terminated in step S170, a final termination is performed, and when the current state is not terminated in step S170, the method returns to step S140 to thereby determine and analyze the changed contents in accordance with the policy based on the resource in which a fault is generated.

Meanwhile, when there is no request for resource state restoration, the method returns to step S170 to thereby determine whether to terminate the current state.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves such as employed in Internet transmission. In addition, the computer-readable recording medium may be distributed to computer systems over a network, in which computer-readable codes may be stored and executed in a distributed manner.

As described above, according to the embodiments of the present invention, the home/building fault analysis system and method using the resource connection map log compares and analyzes a previous integrated resource state and a current resource state using resource connection map logging information based on a standard resource management model when a fault is generated, provides state information of the resource in which information having high association with a fault resource is mainly changed, and performs an effective fault analysis and process by restoring to the previous resource state, as necessary.

In addition, according to the embodiments of the present invention, when the fault is generated, a synthetic state of resources within a home/building as well as a state of an individual resource may be known from the resource connection map, and existing resources and resource connection information may be obtained, and therefore the cause of the fault may be analyzed by comparison with a current resource state.

While the example embodiments of the present invention and their advantages have been described in detail, it should be understood that various changes, substitutions and alterations may be made herein without departing from the scope of the invention.

What is claimed is:

1. A home/building fault analysis system comprising:
   a plurality of resources that include at least one of a plurality of devices running on a processor, networks, and processors running services; and
   a home/building log-based fault management device that is connected with each of the resources via a network to thereby collect information of each of the resources, generates and maintains a resource connection map based on the collected information of each of the resources, compares and analyzes, when a fault is generated, a previous integrated resource state and a current resource state using resource connection map logging information to thereby provide, to a user, state information of the resource in which information having high association with a fault resource is mainly changed, and performs an effective fault analysis and process by restoring the current resource state to the previous resource state, as necessary,
   wherein the home/building log-based fault management device includes
   a plurality of resource information collection modules that are connected with the plurality of resources via the network to thereby periodically collect the information of each of the resources,
   a home/building resource management module that processes resources within a home/building to targets to be managed based on the information of the resources collected from each of the plurality of resource information collection modules, and analyzes a relation between the resources to thereby generate the resource connection map,
   a local storage module that stores the resource connection map periodically transmitted from the home/building resource management module, and information about resource events, and
   a fault analysis and state restoration module that compares and analyzes, when a fault is generated, the previous integrated resource state and the current resource state using the resource connection map logging information transmitted from the home/building resource management module to thereby provide, to the user, the state information of the resource in which information having high association with the fault resource is mainly changed, and performs the effective fault analysis and process by restoring the current resource state to the previous resource state, as necessary.

2. The home/building fault analysis system of claim 1, wherein the home/building resource management module is provided with the information of the resources periodically collected through each of the plurality of resource information collection modules to thereby generate the resource connection map, transmits the generated resource connection map to the local storage module or the fault analysis and state restoration module, manages the managed resource and connection information so that the managed resource and the connection information are periodically recorded in the local storage module, and manages event information when an event is generated so that the event information is stored in the local storage module.

3. The home/building fault analysis system of claim 1, wherein the home/building resource management module includes
   an integrated information storage unit for each resource that is provided with the information of the resources periodically collected from each of the plurality of resource information collection module to thereby store integrate information for each resource, an integrated resource connection map generating unit that aggregates all the integrated information for each resource stored in the integrated information storage unit to thereby generate an integrated resource connection map of all resources, a resource connection map and event logging unit that synthetically manages the resource connection map transmitted from the integrated resource connection map generating unit and a variety of event logs, and performs resource connection map and event logging, and a logging information providing unit that provides information logged from the resource connection map and event logging unit to the local storage module or the fault analysis and state restoration module.

4. The home/building fault analysis system of claim 3, wherein the resource connection map and event logging unit periodically logs and records a current resource connection map managed in the integrated resource connection map generating unit to thereby transmit the recorded current resource connection map to the logging information providing unit, logs and records information associated with an event generation time when an event is generated in the home/building resource management module to thereby transmit the recorded information to the logging information providing unit, and provides the resource connection map of a specific timestamp based on the logged contents to the logging information providing unit.

5. The home/building fault analysis system of claim 1, wherein the fault analysis and state restoration module analyzes the fault based on the resource connection map managed in the home/building resource management module, is provided with corresponding fault generation information through the home/building resource management module when the fault is generated in the resource to be managed in the home/building, requests the fault analysis from the home/building resource management module when a resource control execution has failed, when an error message is received, or when a request of the user is received, is provided, from the home/building resource management module, with a log resource connection map when the resource exists in the resource connection map, or when the resource control execution has succeeded to thereby analyze any differences with a current resource connection map, and restores the resource state to the previous state based on the results of the analysis.

6. The home/building fault analysis system of claim 1, wherein the fault analysis and state restoration module includes a timestamp log information requesting unit that requests the resource connection map logging information of a specific timestamp from the home/building resource management module, a current map and log map analyzing unit that compares and analyzes differences between the resource connection map of the specific timestamp requested by the home/building resource management module through the timestamp log information requesting unit and the current resource connection map, and a fault analysis result processing and resource state restoring unit that receives results analyzed through the current map and log map analyzing unit in a stepwise manner to thereby determine the cause of an error or restore the current resource state to the previous state.

7. The home/building fault analysis system of claim 6, wherein the current map and log map analyzing unit analyzes a change in relation between a log resource connection map of the specific timestamp and the current resource connection map, or analyzes a change between the current resource state and a log resource state of the specific timestamp.

8. The home/building fault analysis system of claim 6, wherein the fault analysis result processing and resource state restoring unit restores all the resources of the resource connection map to a resource state when being logged, or restores all the resources to a resource state when being logged in a stepwise manner along the resource connection map.

9. A method for analyzing faults of resources within a home/building using a resource connection map log in a system including a plurality of resources and a home/building log-based fault management device, the method comprising:

collecting information of each of the resources through the home/building log-based fault management device, and generating and maintaining a resource connection map based on the collected information of each of the resources;

comparing and analyzing, when a fault is generated, a previous integrated resource state and a current resource state using resource connection map logging information to thereby provide, to a user, state information of the resource in which information having high association with a fault resource is mainly changed; and performing effective fault analysis and process by restoring the current resource state to the previous resource state, as necessary, wherein, in the comparing and analyzing, the home/building log analysis is performed through the home/building log-based fault management device by analyzing a change in relation between a current resource connection map and a log resource connection map, or analyzing a change between a current resource state and a log resource state.

10. The method of claim 9, after the collecting of the information, further comprising:

requesting home/building fault analysis from the home/building log-based fault management device when resource control execution has failed, or requesting home/building fault analysis when receiving an error message.

11. The method of claim 9, after the collecting of the information, the method further comprising:

requesting, from the home/building log-based fault management device, home/building log with respect to a point of time when the resource control execution has succeeded, or requesting home/building log with respect to a point of time when the resource exists most recently.

12. The method of claim 9, after the comparing and analyzing, further comprising:

returning the entire log resource connection map of a point of time when the home/building log is requested through the home/building log-based fault management device, or returning only relevant information about the requested resource of the point of time when the home/building log is requested.

13. The method of claim 9, wherein, in the comparing and analyzing, a criterion of the home/building log analysis is determined by a predetermined policy using characteristics of the resource connection map.

14. The method of claim 13, wherein the predetermined policy is determined by any one of a depth of the resource map, a relation type, a target domain, and a policy provided by the user.

15. The method of claim 9, wherein, after the comparing and analyzing, a home/building resource state restoration requesting method is performed through the home/building log-based fault management device by requesting restoration of all the resources of the resource connection map to a resource state when being logged, or by requesting restoration to a resource state when being logged in a stepwise manner along the resource connection map.

16. The method of claim 9, wherein, after the comparing and analyzing, a home/building resource state restoration requesting method is performed through the home/building log-based fault management device by restoring a static state of the resource, or restoring a dynamic state of the resource.

17. A method for analyzing faults of resources within a home/building using a resource connection map log in a system including a plurality of resources and a home/building log-based fault management device, the method comprising:

collecting information of each of the resources through the home/building log-based fault management device, and generating and maintaining a resource connection map based on the collected information of each of the resources;

comparing and analyzing, when a fault is generated, a previous integrated resource state and a current resource state using resource connection map logging information to thereby provide, to a user, state information of the resource in which information having high association with a fault resource is mainly changed; and performing effective fault analysis and process by restoring the current resource state to the previous resource state, as necessary, wherein, after the comparing and analyzing, a home/building resource state restoration requesting method is performed through the home/building log-based fault management device by requesting restoration of all the resources of the resource connection map to a resource state when being logged, or by requesting restoration to a resource state when being logged in a stepwise manner along the resource connection map.

* * * * *